(12) United States Patent
Coholan

(10) Patent No.: US 7,823,907 B1
(45) Date of Patent: Nov. 2, 2010

(54) GARBAGE CADDY

(76) Inventor: John A. Coholan, 55 Glen Park Road, St. Catharines (CA) L2N 3E5

( * ) Notice: Subject to any disclaimer, the term of this patent is extended or adjusted under 35 U.S.C. 154(b) by 0 days.

(21) Appl. No.: 12/106,567

(22) Filed: Apr. 21, 2008

(51) Int. Cl.
*B62B 1/00* (2006.01)

(52) U.S. Cl. .................... 280/652; 280/47.26; 280/79.5

(58) Field of Classification Search ................ 280/79.5, 280/79.11, 29, 32.6, 47.11, 47.34, 62, 87.01, 280/652, 47.35, 47.131, 47.19, 47.26, 47.24; 248/129, 95, 137, 907; 220/909, 404
See application file for complete search history.

(56) References Cited

U.S. PATENT DOCUMENTS

| 2,986,401 | A | * | 5/1961 | Altadonna ................. 280/652 |
| 3,191,960 | A | | 6/1965 | Turner |
| 3,402,848 | A | | 9/1968 | Busey |
| 3,907,117 | A | | 9/1975 | Williams |
| 4,357,029 | A | | 11/1982 | Marini et al. |
| D297,378 | S | | 8/1988 | Briscoe |
| D299,578 | S | * | 1/1989 | Wilson ........................ D34/25 |
| D303,306 | S | | 9/1989 | Briscoe |
| 5,040,808 | A | | 8/1991 | McIntyre |
| 5,135,245 | A | | 8/1992 | Pagone et al. |
| 5,375,860 | A | | 12/1994 | Ernsberger et al. |
| D477,900 | S | * | 7/2003 | Ditmars, Jr. .................. D34/24 |
| 6,676,141 | B1 | * | 1/2004 | Hadley .................... 280/47.35 |
| 2006/0284391 | A1 | | 12/2006 | Sheehan |

* cited by examiner

*Primary Examiner*—Hau V Phan

(57) ABSTRACT

The present invention features a garbage caddy comprising (a) a four-sided enclosure formed by a first side, a second side, a third side, and a fourth side, (b) a base disposed within the enclosure and attached thereto, the base having a top side and a bottom side, and (c) a first wheel removably and rotatably mounted to a side of the first side, and a second wheel removably and rotatably mounted to a side of the third side. The first side and third side extend downwardly from the bottom side of the base to form a set of skis. The top side of the base has at least one slot 118a for snugly holding a trash receptacle 200.

2 Claims, 5 Drawing Sheets

(Front view)

(Back view)

GARBAGE CADDY

BACKGROUND OF THE INVENTION

Hauling garbage cans and recycling containers back and forth from storage to a pickup location (e.g., street curb) may be time consuming because several trips may be required. The present invention provides for an apparatus that can conveniently transport more than one trash receptacle from one location to another.

DESCRIPTION OF PREFERRED EMBODIMENTS

Figure 1:
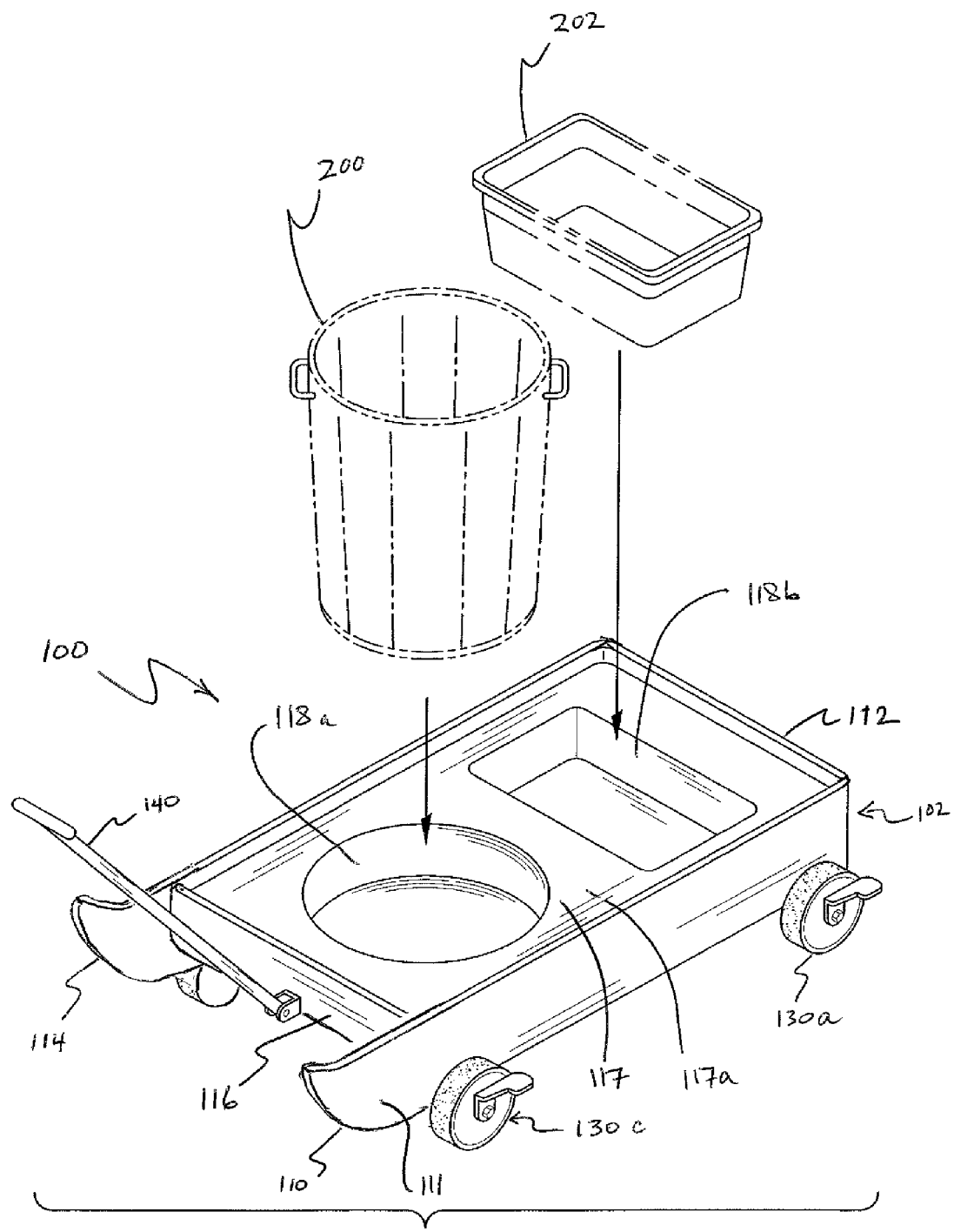
FIG. 1 shows a perspective view of the garbage caddy having wheels removably and rotatably attached to the sides.
Figure 3A:
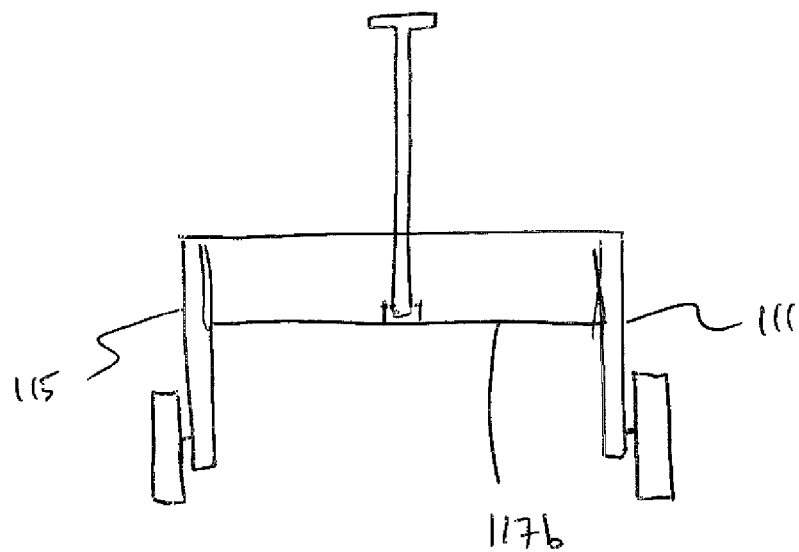
FIG. 3A and FIG. 3B show the garbage caddy from the front and rear view, respectively.
Figure 3B:
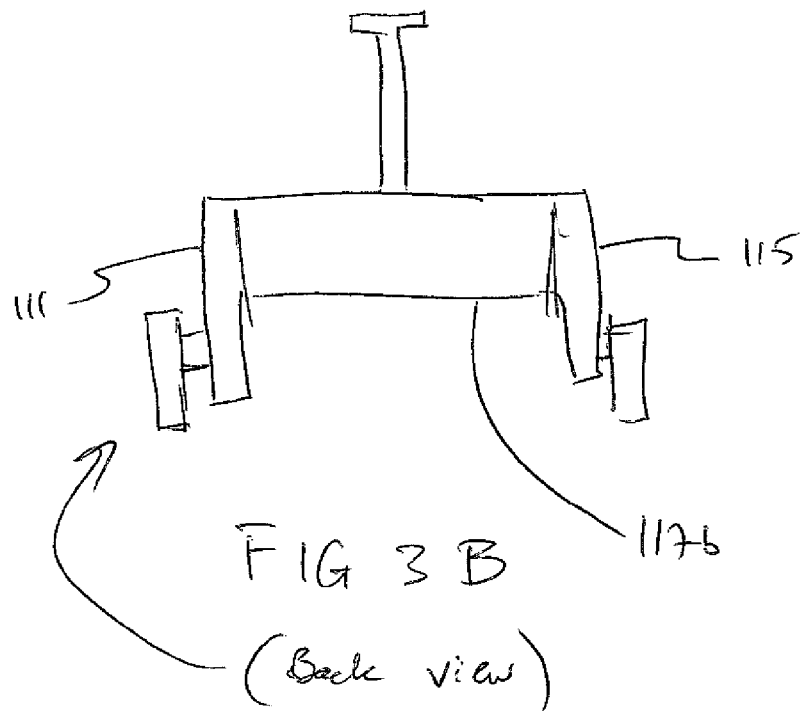
Figure 4:
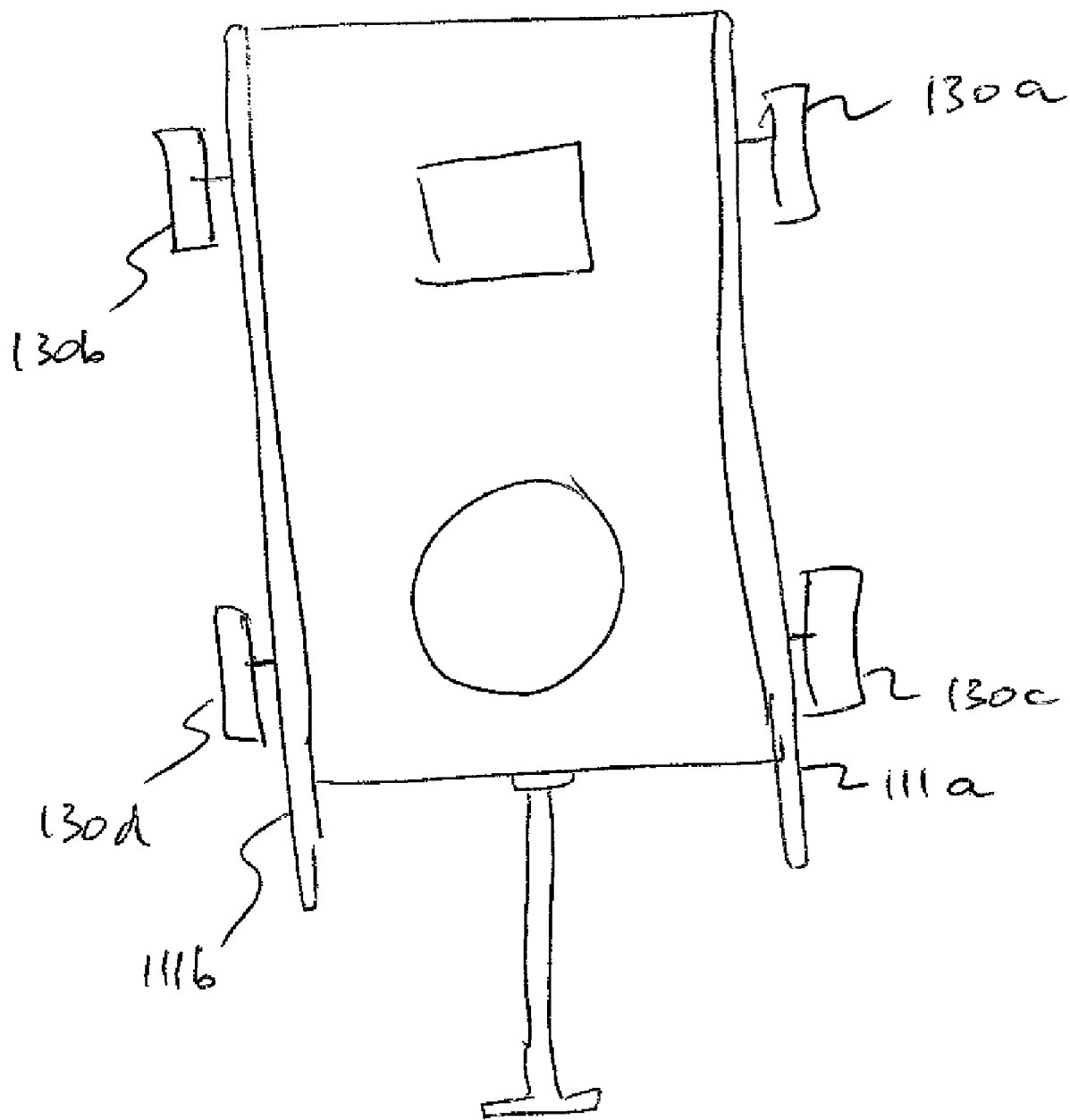
FIG. 4 shows the garbage caddy from the top view.

The present invention features a garbage caddy 100 comprising (a) a four-sided enclosure 102 formed by a first side 110, a second side 112, a third side 114 and a fourth side 116, (b) a base 117 disposed within the enclosure and attached thereto, the base having a top side 117a and a bottom side 117b, and (c) a first wheel 130a removably and rotatably mounted to a side of the first side 111, and a second wheel 130b removably and rotatably mounted to a side of the third side. (See FIG. 1) The first side 110 and third side 114 extend downwardly from the bottom side of the base to form a set of skis. (See FIG. 1, FIG. 3A and FIG. 3B). The top side of the base 117a has at least one slot 118a for snugly holding a trash receptacle 200. (See FIG. 1 and FIG. 4). The "bottom" side 117b of the base 117 faces the earth, and the "top" side 117a of the base 117 faces the sky.

The components (first side 110, second side 112, third side 114, fourth side 116, base 117, wheels 130, etc.) of the garbage caddy 100 may be constructed from any appropriate material, for example, plastic, metal, alloy, wood, and the like. The components may be attached together by any attachment means (e.g., glue, welding, screws, etc.) to form a garbage caddy 100.

Figure 2:
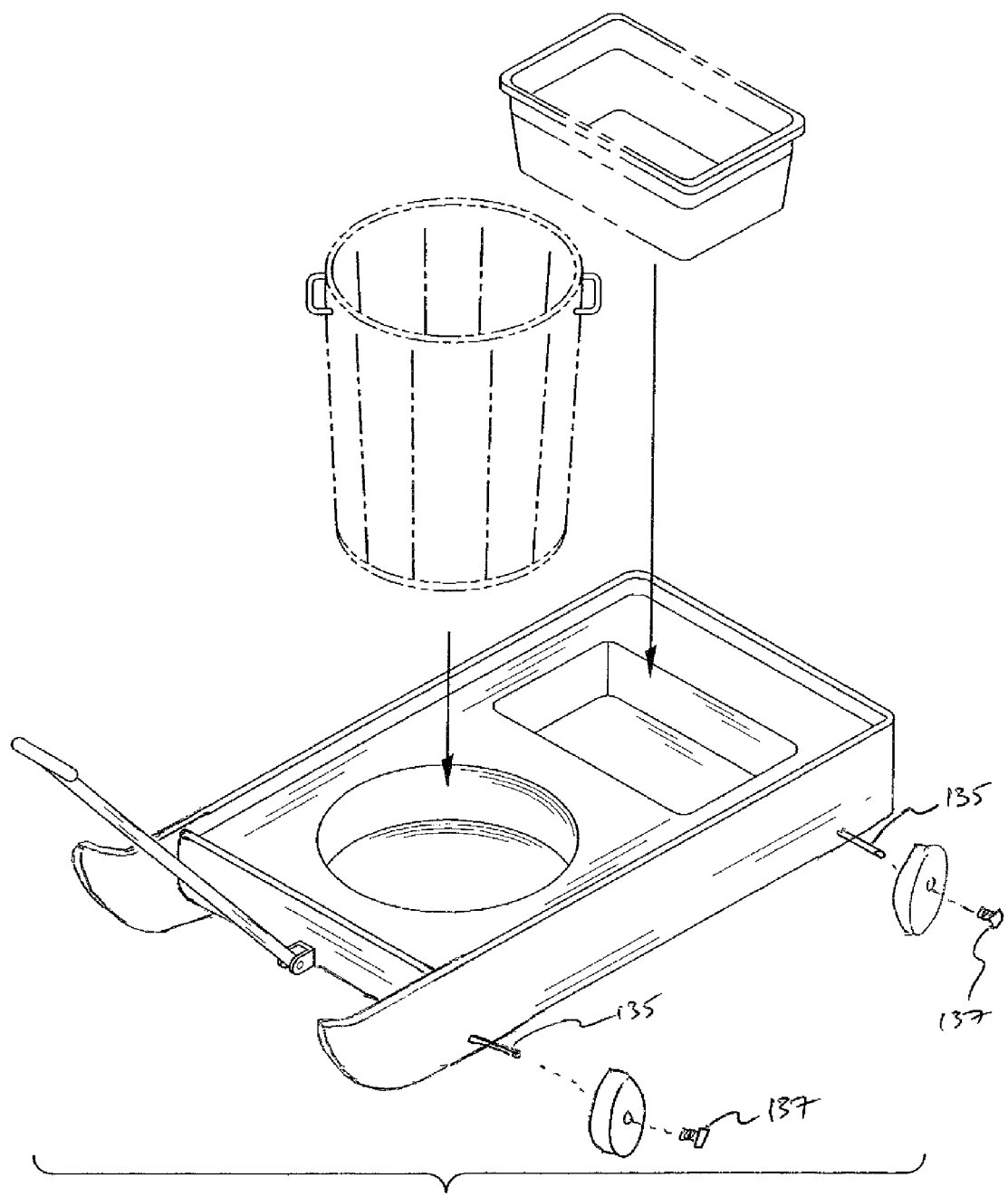
FIG. 2 shows a perspective view of the garbage caddy with the wheels removed, and the first and third sides collapse to the ground and function as a pair of skis.

In some embodiments, the garbage caddy 100 further comprises a third wheel 130c removably and rotatably mounted to a side 111a of the first side 110, and a fourth wheel 130d removably and rotatably mounted to a side 111b of the third side 114. (See FIG. 4). A garbage caddy 100 having wheels 130 can be used to transport trash receptacles when there is no snow on the ground. However, when there is snow on the ground, the wheels may not work well for moving the garbage caddy 100 about. One of the advantages of the present invention is that the present invention provides for an option to remove the wheels 130, whereby the first side 110 and third side 114 effectively become skis so that the garbage caddy 100 can glide on the snow during transportation of the trash receptacles 200/202. (See FIG. 2). In some embodiments, the wheels 130 can be removably and rotatably mounted on a stud 135 (which projects outwardly from the first and third sides) and secured to and rotate about the stud 135 by a screw 137, wherein the wheel 130 is sandwiched between the side 110 or 114 and the screw 137. (See FIG. 2).

The base 117 of the garbage caddy 100 can have one slot 118a which can snugly hold a single trash receptacle 200. (See FIG. 1). In some embodiments, the base 117 comprises a second slot 118b for holding a second trash receptacle 202 (e.g., a recycling bin). In some embodiments, the base 117 comprises more than two slots to hold more than two trash receptacles. The slots may be of any geometric shape, e.g. circular, rectangular.

Figure 5:
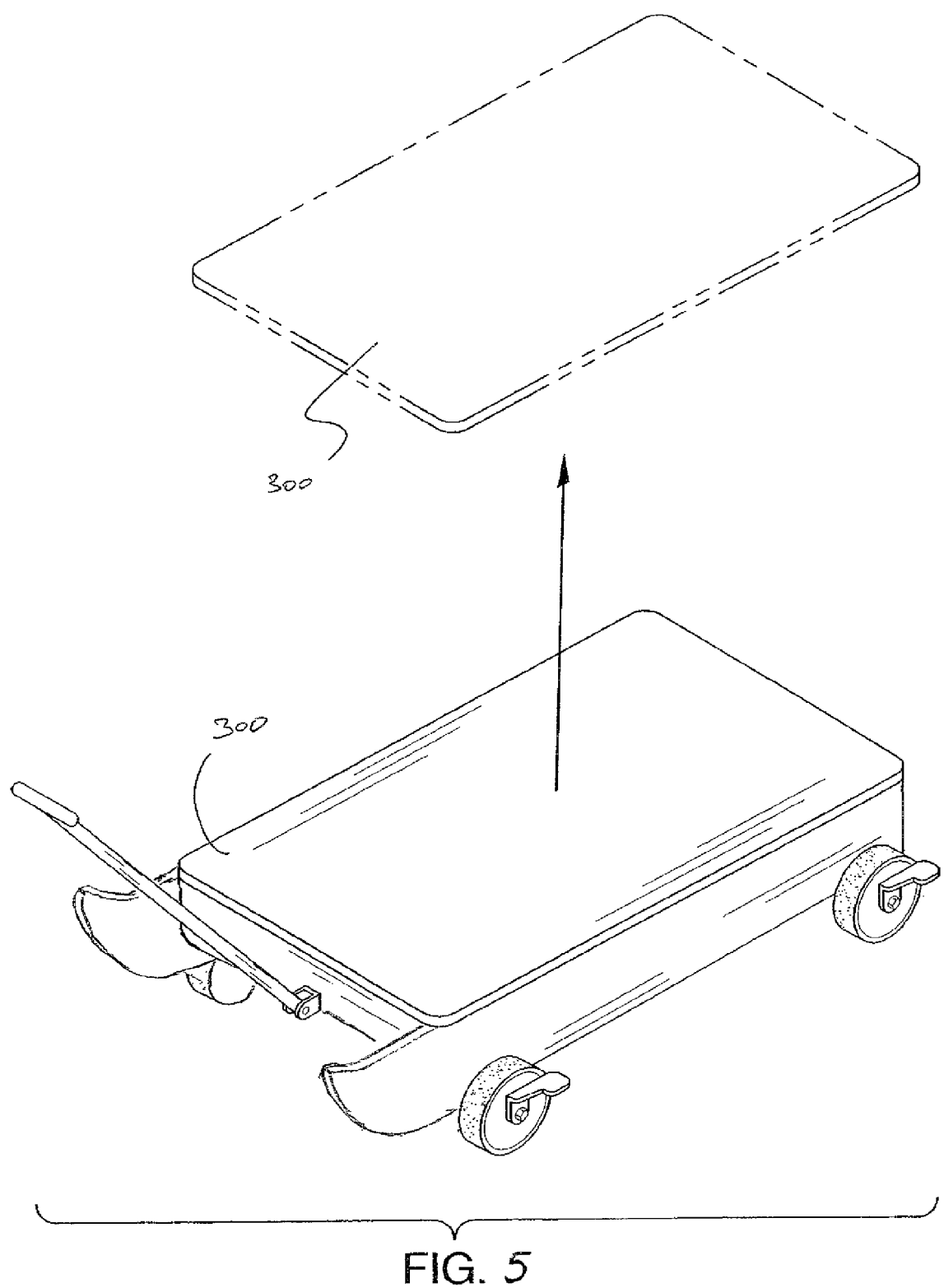
FIG. 5 shows a perspective view of the garbage caddy having a cover member which covers up the top portion of the base.

In some embodiments, the top 117 of the base can be covered by a cover member 300. (See FIG. 5).

In some embodiments, a handle bar 140 is attached to the front portion, e.g., the exterior of the fourth side, for pulling the garbage caddy 100 along.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A garbage caddy comprising
   (a) a four-sided enclosure formed by a first side, a second side, a third side, and a fourth side;
   (b) a base disposed within the enclosure and attached to thereto, the base having a top side and a bottom side, and
   (c) a first wheel removably and rotatably mounted to a side of the first side, and a second wheel removably and rotatably mounted to a side of the third side,
   the first side and third side extend downwardly from the bottom side of the base to form a set of skis,
   the top side of the base has a first circular slot configured for snugly holding a circular based trash receptacle and a second rectangular slot for snugly holding a rectangular based recycling bin.

2. The garbage caddy of claim 1 further comprising a third wheel removably and rotatably mounted to a side of the first side, and a fourth wheel removably and rotatably mounted to a side of the third side.

* * * * *